No. 677,526. Patented July 2, 1901.
J. MANES.
WEIGHING MACHINE.
(Application filed Dec. 19, 1900.)
(No Model.) 2 Sheets—Sheet 1.
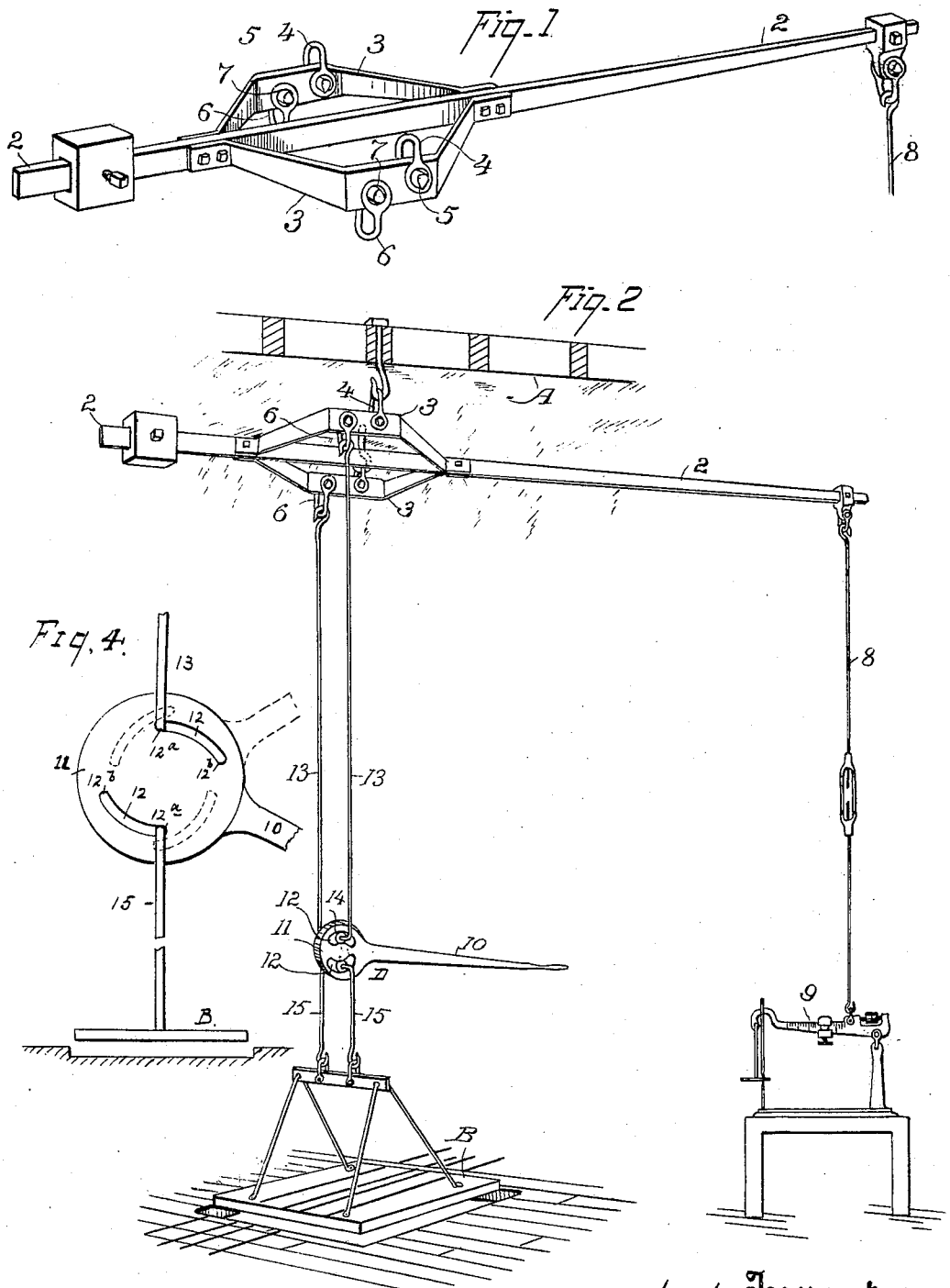
Witnesses,
Inventor,
John Manes,
F. Dewey Strong
att'y No. 677,526. Patented July 2, 1901.
J. MANES.
WEIGHING MACHINE.
(Application filed Dec. 19, 1900.)
(No Model.) 2 Sheets—Sheet 2.
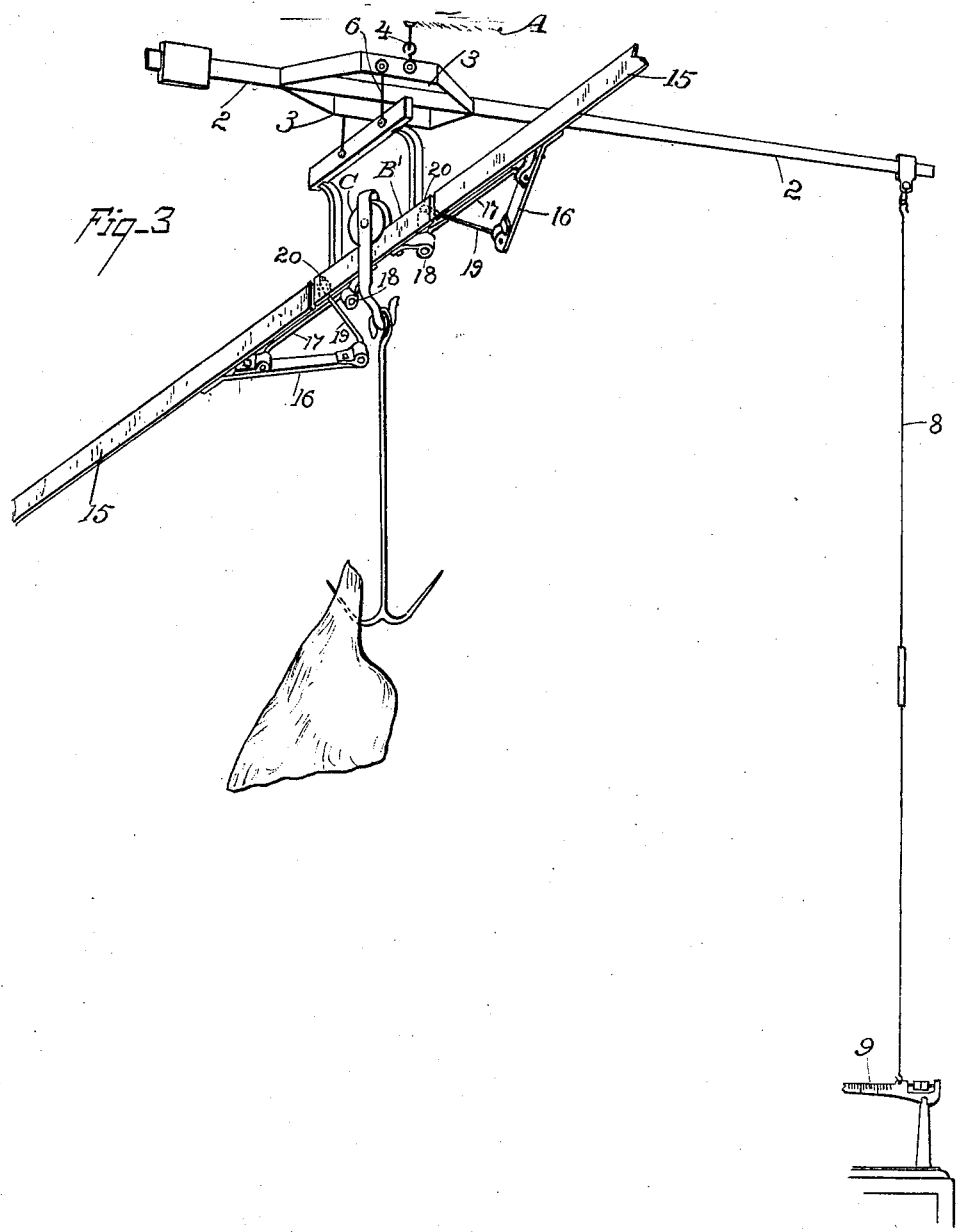

United States Patent Office.

JOHN MANES, OF SAN FRANCISCO, CALIFORNIA, ASSIGNOR, BY DIRECT AND MESNE ASSIGNMENTS, TO SUSPENSION BEAM SCALE CO., OF CALIFORNIA.

WEIGHING-MACHINE.

SPECIFICATION forming part of Letters Patent No. 677,526, dated July 2, 1901.

Application filed December 19, 1900. Serial No. 40,428. (No model.)

*To all whom it may concern:*

Be it known that I, JOHN MANES, a citizen of the United States, residing in the city and county of San Francisco, State of California, have invented an Improvement in Weighing-Machines; and I hereby declare the following to be a full, clear, and exact description of the same.

My invention relates to improvements in balances for weighing liquids, solids, and other bodies.

It consists, essentially, of an outrigging upon either side of the balance-beam, stirrups by which the balance is suspended, weighing or platform stirrups, said supporting and weighing stirrups attached to this outrigging, a weighing-platform provided with tracks upon which trucks, trolley-carriers, and the like may be rolled and weighed, a liquid weighing and measuring tank in combination therewith, means by which the platform may be raised from its bed and cleared of the ground, and of details more fully to be set forth in the following specification and accompanying drawings.

Figure 1 is a perspective view of my scale-beam with its outrigger attachment. Fig. 2 shows its application in conjunction with platform, lifting-lever, and small scale attachment. Fig. 3 is a perspective of the trolley and track-platform. Fig. 4 is an enlarged view of the head 11 and its slots.

The object of my invention is to combine with a single balance-beam a simple mechanism whereby articles, particularly heavy bodies, rolled upon tracks or trolleyed from a distance may be weighed.

My device, while designed especially for use in butcher-shops and provision and packing establishments, &c., whereby, as in the first instance, whole beeves may be run in on a single overhead trolley, weighed without unloading, and passed on, is equally applicable as a "platform-scale" for tracked carriages, like cars, or for ordinary vehicles, &c.

The device is suspended from some suitable support, as a ceiling A.

The form of balance I prefer is that shown, though it may be of the ordinary "steelyard" type.

2 represents the beam, having the extension-frame or outriggers 3 embracing its fulcrum-points, (the points from which the beam would ordinarily be suspended and from which the weighing-platform would depend.) This beam is suspended from the ceiling by the stirrups 4, having the usual knife-edge bearings 5 upon the outriggers. The weighing-stirrups 6 depend from the outriggers at 7 on similar bearings. To the usually graduated end of this beam I attach a rod 8, which connects with a small scale 9, located at some convenient spot near the floor. The weight of the article to be supported upon the beam 2 is determinable upon the scale 9. To the stirrups 6 I attach my weighing-platform B. This platform B may rest in a bed or recess in the floor, or it may be suspended at a height in line with an overhead trolley C, as shown. It may be provided with one or two tracks, as desired. When recessed, as first instanced, in order that it may be lifted out of the recess or bed when weighing heavy articles, so that it will swing clear of any obstruction, I suspend the platform to the stirrups 6 by means of a cam-lever D. This lever consists of a handle or lever portion 10, having an enlarged head 11, in which are the oppositely-disposed curved slots 12. A hanger 13 engages slidably at 14 in one of these slots, and the other end of the hanger connects with the stirrups 6. A similar slidable hanger 15 supports the platform. The slots 12 are properly eccentric to each other, the inner ends $12^a$ of said slots being nearer to each other than their outer ends $12^b$ are to each other. When the platform rests in its recess, the links 13 and 15 will be at the outer ends of the slots, as shown in dotted lines. A simple downward movement of the lever-handle will cause the ends of the hangers to approach each other until they rest supported at the ends $12^a$ of said slots. The platform is thus lifted clear of the ground. When used in overhead-trolley connections, this platform will simply take the form of a short track B', arranged in line with the main trolley-track C, whereby the object to be weighed may be rolled directly upon it. The track-section B' is suspended from the stirrups or links 6 upon the outriggers. These links attach to a horizontal bar forming part of the track-section frame. To this bar are secured C-shaped supports, upon which the track-section is carried.

Various methods are possible of retaining the alinement of the tracks. I have shown a means as follows: At either end and secured upon the same side of the main track where it joins the weighing track or section B' are acutely-angled guide-arms 16. Links 17, attached to these arms, extend parallel with the tracks and connect with the weighing-track at 18, so as to hold the latter from longitudinal displacement. Links 19 extend from the outer ends of the arms and attach at approximately right angles to the weighing-track at 20 and prevent lateral displacement. These links are loosely held at their points of attachment, so as not to interfere with the necessary vertical movement of the track-platform. This method of keeping the track-section always in line with the main track is simple, offers a limited number of frictional points, and interferes in no way with the operation of the trolley C, carrying the weight.

By means of a beam constructed with outriggers, as I have shown, I am able to give proper support to the track-section by having the ends of the latter disposed almost beneath the fulcrum-points on the beam. As a result of such construction it gives a scale of great strength coupled with extreme sensitiveness. This latter is also due to the fact of the limited number of bearing-points and the elimination of the usual complicated system of levers. Simplicity, strength, and sensitiveness are features of the greatest importance in scales of this nature.

Having thus described my invention, what I claim as new, and desire to secure by Letters Patent, is—

1. In a weighing-machine, a balance-beam having a portion between its opposite ends provided with open frames or outriggers, one on each side, suspending knife-edges upon said frames, and other knife-edges upon these frames from which the load is suspended.

2. In a weighing-machine, the combination of a beam, an outrigger upon each side thereof at a point between the opposite ends of the beam, and a double series of knife-edges on the outriggers one series suspending the beam from a point above and the other series suspending the load, and adjustable connections between the beam and a second weighing-beam.

3. The combination in a weighing-machine of a balance-beam having outriggers, means of suspending said beam from its outriggers to an overhead support, a short track-section dependent from said outriggers adapted to form part of a main trolley-line system, and means of connection of the section and the two parts of the main line near the contiguous ends of the section and these parts whereby the section is held in alinement with said parts.

4. The combination in a weighing-machine, with an overhead support, of a balance-beam having outriggers, a fulcrum projection upon either of these outriggers, upon which the balance is supported, similar fulcrum projections from which a load-support is depended, said support consisting of a short track fitting as a section in a main trolley-line, arms upon the main track, links connecting these arms and the platform-track whereby lateral or horizontal displacement is prevented, and a vertical movement of the platform permitted.

In witness whereof I have hereunto set my hand.

JOHN MANES.

Witnesses:
S. H. NOURSE,
JESSIE C. BRODIE.